United States Patent [19]

Florus et al.

[11] 3,828,198
[45] Aug. 6, 1974

[54] DEVICE FOR FORMING AND PROCESSING VELOCITY SIGNALS IN VEHICLES

[75] Inventors: Hans-Jörg Florus, Goppingen; Horst Grossner, Geradstetten; Gerhard Osswald, Donzdorf, all of Germany

[73] Assignee: Daimlee-Benz Aktiengesellschaft, Stuttgart, Germany

[22] Filed: Jan. 26, 1973

[21] Appl. No.: 327,168

[30] Foreign Application Priority Data
Jan. 25, 1972 Germany............................ 2203320

[52] U.S. Cl................................. 307/120, 324/161
[51] Int. Cl........................................... H01h 35/00
[58] Field of Search........ 307/9, 120; 324/161, 173, 324/174; 317/5; 340/263

[56] References Cited
UNITED STATES PATENTS
3,560,854    2/1971    Moss et al........................... 324/161
3,714,458    1/1973    Arai et al....................... 324/174 X

*Primary Examiner*—B. Dobeck
*Assistant Examiner*—M. Ginsburg
*Attorney, Agent, or Firm*—Craig & Antonelli

[57]                ABSTRACT

A system for producing and processing velocity signals in vehicles, especially in motor vehicles, in which a sensor is present that serves for producing a signal having a frequency proportional to the vehicle velocity; this frequency signal is fed to a following basic circuit which converts this frequency signal into rectangular pulses of both constant on and constant off time; as many switching stages for different velocity thresholds as desired can thereby be connected to this basic circuit.

25 Claims, 3 Drawing Figures

PATENTED AUG 6 1974　　3,828,198

DEVICE FOR FORMING AND PROCESSING VELOCITY SIGNALS IN VEHICLES

The present invention relates to an installation for the formation and the processing of velocity signals in vehicles, especially in motor vehicles.

Velocity-dependent interactions or signals are necessary for several devices in vehicles, for example, for an automatic speed control, for detecting shifting thresholds in automatic transmissions, for criteria for the exhaust gas regulation, for influencing shock absorber characteristics, etc. It is thereby of significance for the most part when predetermined velocity thresholds are exceeded or dropped below. Known systems utilized heretofore contactless indicators which are influenced by the tachometer needle, for example, make-and break-oscillators or optical systems. Also mechanical switches are used which are also actuated by the deflection of the tachometer needle. However, all known prior art methods entail the disadvantage that they can be used only for a limited number of switching or shifting points, this is so in particular for constructional reasons. Therebeyond, switching forces are required for the mechanical switches of the prior art which prevent a linear deflection of the tachometer needle.

It is the aim of the present invention to provide an installation which avoids the aforementioned disadvantages and which enables in particular the realization of as many velocity thresholds as desired.

The underlying problems are solved according to the present invention in that a sensor is present which serves for producing a signal having a frequency proportional to the vehicle velocity, that this frequency signal is adapted to be fed to a following basic circuit which converts this frequency signal into rectangular pulses of constant on- or off-duration, i.e., of constant conductive or non-conductive periods of time, and in that as many switching stages as desired for different velocity thresholds are adapted to be connected to this basic circuit. It is possible with the aid of such a central unit consisting of sensor and basic circuit to obtain all velocity and acceleration signals needed in the vehicle and derived from the vehicle velocity. Depending on the number or type of switching stages to be connected, it may be appropriate according to the present invention to incorporate the frequency-voltage converter disposed in the input section of the second switching stage into the basic circuit whereby it will be required only once, and to make its output of as low ohmic a value as possible. The d.c. voltage appearing at its output which is proportional to the vehicle velocity, can then be further processed in as many switching stages, differentiating elements, etc. as desired to be connected to the output of the basic circuit.

According to a preferred embodiment of the present invention, the sensor for detecting the frequency proportional to the velocity consists of an electric coil secured at the tachometer housing, which is located in the a.c. field of the tachometer magnets. This construction is not only very simple structurally but opens up also the advantageous possibility of a subsequent installation into a vehicle.

The input section of the basic circuit consists of an operational amplifier connected as a comparator which converts the signals derived from the sensor into rectangular pulses. A differentiating element is connected in the output of the comparator which converts the rectangular pulses derived from the comparator into negative needle pulses, i.e., into sharp negative pulse pips of short durations. A monostable multivibrator follows the differentiating element which is controlled by the negative needle pulses derived from the differentiating element and makes available at its output rectangular pulses with a constant on- or off-time.

The basic circuit includes for the control of differently constructed switching stages, two low-ohmic outputs which are constituted in that the output of the monostable multivibrator leads directly to the first output and leads by way of an inverter stage to the second output.

As many first switching stages as desired are adapted to be connected to the first output of the basic circuit which switch when dropping below a predetermined velocity or during the standstill of the vehicle while as many second switching stages as desirable are adapted to be connected to the second output of the basic circuit which switch when exceeding a predetermined vehicle velocity.

An integrating element is arranged in the input section of a first swithcing stage which integrates the rectangular pulses coming from the first output of the basic circuit. A transistor connected as comparator follows the integrating element which blocks when dropping below a voltage proportional to the predetermined velocity. A current amplifier follows the comparator, in the output circuit of which is connected a switching relay.

A frequency-voltage-converter is arranged in the input section of a second switching stage which converts the rectangular pulses appearing at the second output of the basic circuit into a d.c. voltage. An operational amplifier connected as comparator follows the frequency-voltage converter, which operational amplifier switches when exceeding a d.c. voltage proportional to a predetermined vehicle velocity. A current amplifier follows the comparator, in the output circuit of which is again connected a switching relay.

Accordingly, it is an object of the present invention to provide an installation for forming and processing velocity signals in vehicles, especially in motor vehicles, which avoids by simple means the disadvantages encountered with the prior art systems.

Another object of the present invention resides in a system for forming and processing velocity signals in vehicles which eliminates any restrictions as to the number of velocity-controlled devices and thresholds that can be connected thereto.

A further object of the present invention resides in an installation for forming and processing velocity signals in motor vehicles which eliminates the need for shifting forces to actuate mechanical switches, thereby eliminating any restrictions as to any linear deflection of the tachometer needle.

A still further object of the present invention resides in a system for forming and processing velocity signals in vehicles which permits the use of as many velocity thresholds as desired.

Another object of the present invention resides in a control system of the type described above which is simple in construction, minimizes the number of circuit components and offers great reliability in operation.

These and other objects, features, and advantages of the present invention will become more apparent from the following description when taken in connection with the accompanying drawing which shows, for purposes of illustration only, one embodiment in accordance with the present invention, and wherein.

Referring now to the drawing wherein like reference numerals are used throughout the various views, the following reference characters designate in each of the views of the drawing the following element.

Figure 1:
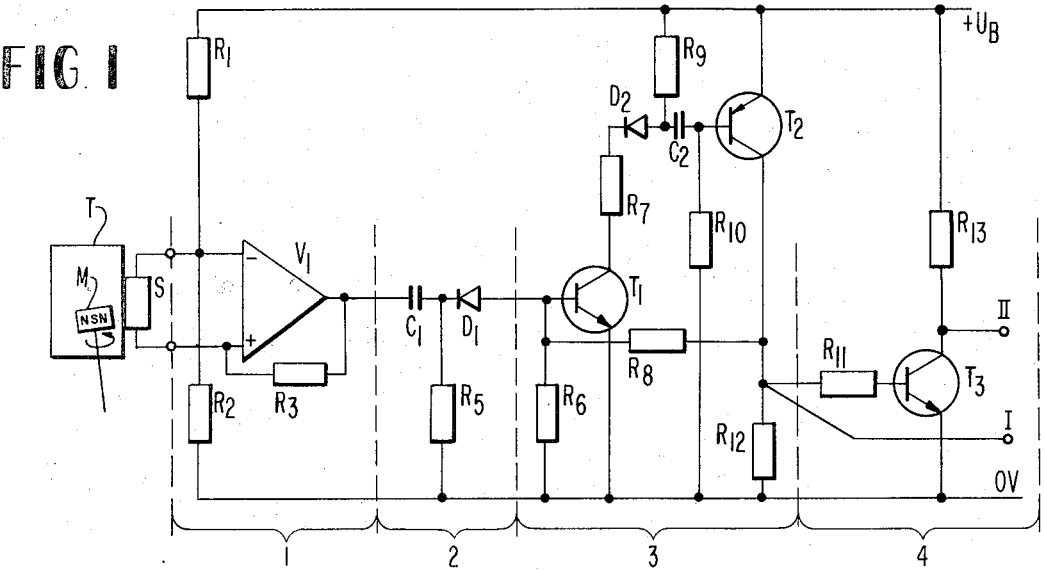
FIG. 1 is a schematic circuit diagram of a sensor mounted at a tachometer housing together with the basic circuit in accordance with the present invention.

R with index . . . — a resistor
C with index . . . — a condenser
D with index . . . — a diode
T with index . . . — a transistor
V with index . . . — an operational amplifier
Rel with index . . . — a relay Referring now more particularly to FIG. 1 of the drawing, the sensor S consisting of a coil secured at the tachometer housing T is connected with one end of its winding at the non-inverting input of an operational amplifier $V_1$ connected as comparator 1 and with its other end to the inverting input thereof, which is simultaneously connected to the tap of a voltage divider $R_1$ and $R_2$ between battery voltage $+U_B$ and ground. A differentiating element 2 consisting of condenser $C_1$, resistor $R_5$ and diode $D_1$ is connected to the output of the operational amplifier $V_1$. A monostable multivibrator 3 consisting of elements $T_1$, $T_2$, $R_6$ to $R_{10}$ and $R_{12}$, $C_2$ and $D_2$ follows the differentiating element 2. The collector of transistor $T_2$ forms the output I of the basic circuit illustrated in FIG. 1 while the collector of an inverter 4 connected thereto and consisting of elements $R_{11}$, $R_{13}$ and $T_3$ forms the output II. Both outputs I and II are therefore low-ohmic outputs.

An a.c. voltage is induced in the coil S by the alternating field of the tachometer magnet M in accordance with the rotation of the magnet. The one coil end has applied thereto a constant reference potential by means of the voltage divider $R_1$, $R_2$, with respect to which the potential of the induced voltage at the other coil end fluctuates correspondingly between positive and negative values. The operational amplifier $V_1$ is so connected in the circuit that it produces a signal when the potential at its non-inverting input exceeds the potential at its inverting input. Accordingly, it converts the induced a.c. voltage into rectangular pulses.

The following differentiating element 2 forms negative needle pulses from the trailing flanks of these rectangular pulses. These negative needle or sharp pulses serve for the control of a monostable multivibrator 3 formed by transistors $T_1$ and $T_2$ whose two transistors $T_1$ and $T_2$ conduct in the noncontrolled condition. Consequently, the output I in the non-controlled condition is at a voltage of approximately $+U_B$ whereas in the controlled condition during the pulse duration, it is at a voltage of about 0 volts. An inverter 4 is connected to the output of the multivibrator 3, whose output II is at about 0 volts in the non-controlled condition whereas it is approximately at $+U_B$ volts in the controlled condition.

Figure 2:
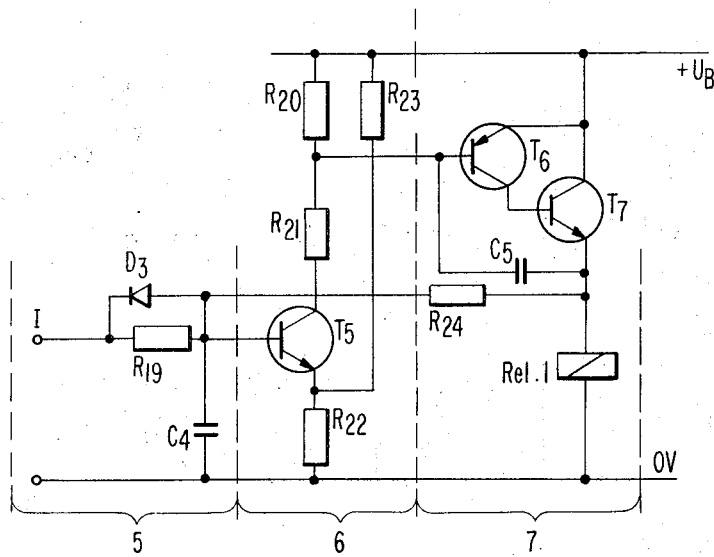
FIG. 2 is a schematic circuit diagram of a shifting stage for indicating the vehicle standstill in accordance with the present invention.

A switching stage is illustrated schematically in FIG. 2 which produces a signal during the standstill of the vehicle. An integrating element 5 consisting of elements $R_{19}$ and $C_4$ is connected at its input whereby a diode $D_3$ is connected in parallel to the resistance $R_{19}$. The output of the integrating element 5 is connected to the base of a transistor $T_5$ which, together with the resistances $R_{20}$ to $R_{23}$ is connected as comparator 6. The output of this comparator 6 is located between elements $R_{20}$ and $R_{21}$ and is connected with the input of a current amplifier 7 constituted by transistors $T_6$ and $T_7$. A relay $Rel_1$ is connected in the output circuit of this current amplifier 7, between the emitter of transistor $T_7$ and the ground (0 volts). The emitter of transistor $T_7$ is connected with the base of transistor $T_5$ by way of a resistance $R_{24}$.

The input of this switching stage is connected with the output I of the basic circuit of FIG. 1. In the non-controlled condition, i.e., during standstill of the vehicle, the capacitor $C_4$ is positively charged by way of resistor $R_{19}$ and the conducting transistor $T_2$ to such an extent that transistor $T_5$ conducts. The transistor $T_5$ is adjusted by way of elements $R_{22}$ and $R_{23}$ to a predetermined emitter potential. In the non-controlled condition, the potential at the base of transistor $T_5$ is more positive than the emitter potential of the transistor $T_5$, whence this transistor conducts with certainty. Consequently, also the transistors $T_6$ and $T_7$ conduct so that the relay $Rel_1$ attracts and thereby produces a signal. The brake lights or special stop lights may be turned on by this signal during the standstill of the vehicle.

As soon as the vehicle starts, the monostable multivibrator stage 3 of the basic circuit is controlled and the transistor $T_2$ becomes non-conductive for a predetermined period of time determined by the monostable multivibrator 3, which repeats itself during each control pulse. In this condition, the capacitor $C_4$ discharges by way of the diode $D_3$ and the resistor $R_{12}$ with the time constant $C_4 \cdot R_{12}$. Few pulses suffice to discharge the capacitor $C_4$ and therewith to block the transistors $T_5$, $T_6$ and $T_7$ whereby the relay $Rel_1$ drops and the signal terminates. The resistance $R_{24}$ is provided for the formation of a hysteresis in order that a flickering light does not occur during the charging and discharging of the capacitor $C_4$ about the switching point of the transistor $T_5$.

Figure 3:
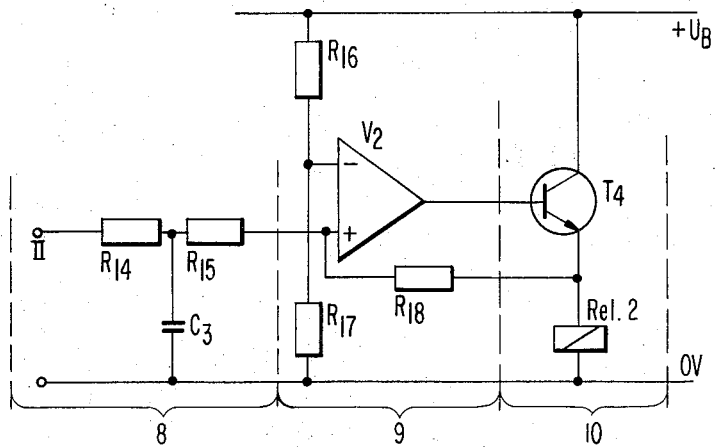
FIG. 3 is a schematic circuit diagram of a shifting stage for indicating a predetermined velocity in accordance with the present invention.

FIG. 3 illustrates schematically a switching stage for the formation of velocity thresholds. A T-filter element constituted by elements $R_{14}$, $R_{15}$ and $C_3$ is located in the input section, which is connected with the non-inverting input of an operational amplifier $V_2$ which is connected together with elements $R_{16}$ and $R_{17}$ as comparator 9. A transistor $T_4$ follows the comparator 9 as current amplifier 10 whose emitter resistance is formed by a relay $Rel_2$. The emitter of transistor $T_4$ is connected by way of a resistance $R_{18}$ with the non-inverting input of the operational amplifier $V_2$. This switching stage is connected with the output II of the basic circuit which lies at ground potential (0 volts) in the non-controlled condition. The T-element disposed at the input forms the average value of the rectangular output signals from the basic circuit and constitutes a simple circuit for a frequency-voltage converter 8. The inverting input of the operational amplifier $V_2$ is kept by the voltage divider $R_{16}$, $R_{17}$ at a predetermined potential proportional to a predetermined vehicle velocity. As soon as the average value corresponding to the frequency arriving at the input now exceeds this potential at the noninverting input of the operational amplifier $V_2$, i.e., when the vehicle velocity determined by elements $R_{16}$ and $R_{17}$ is exceeded, then the operational amplifier $V_2$ produces a signal whereby the transistor $T_4$ becomes conductive and attracts the relay $Rel_2$. When dropping below the velocity threshold, the relay again drops off. In order that a flickering signal is not produced also with this embodiment due to the simplicity of the T element, a resistor $R_{18}$ is provided by means of which the operational amplifier $V_2$ switches with a predetermined hysteresis.

The outputs of the basic circuit are of very low ohmic value whereas those of the switching stages are constructed of very high ohmic values so that a large number of switching stages can be connected to each output of the basic circuit.

The transistors, relays and diodes as well as the other elements of the electrical circuits are of conventional type as commercially available. Furthermore, the numerical value for the resistors and capacitors are within the skill of those familiar with circuit designs. Typical values of such elements, given only for purposes of illustration, are as follows:

```
C₁=1 nF              R₁₃=1 K Ω
C₂=10 nF             R₁₄=10 K Ω
C₃=10 μF             R₁₅=10 K Ω
C₄=47 μF             R₁₆=3.9 K Ω
C₅=67 nF             R₁₇=1 K Ω
D₁,D₂=1 N 914        R₁₈=2 M Ω
D₃=1 N 914           R₁₉=82 K Ω
R₁=220 Ω             R₂₀=4.7 K Ω
R₂=220 Ω             R₂₁=4.7 K Ω
R₃=470 K Ω           R₂₂=2.7 K Ω
R₄=3.9 K Ω           R₂₃=4.7 K Ω
R₅=4.7 K Ω           R₂₄=100 K Ω
R₇=680 Ω             T₁, T₃=BCY 58
R₈=22 K Ω            T₂=BCY 78
R₉=1.2 K Ω           T₄=BCY 58
R₁₀=50 K Ω           T₅, T₇=BCY 58
R₁₁=5.6 K Ω          T₆=BCY 78
R₁₂=470 Ω            U_B=+12 V
V₁=TAA 522
V₂=TAA 522
```

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An installation for the formation and processing of velocity signals in vehicles, especially automotive vehicles, characterized by a sensor means for producing a signal having a frequency proportional to the vehicle velocity, and a basic circuit means having input and output means and operatively connected with its input means to the sensor means, the basic circuit means being operable to convert the frequency signal of the sensor means into rectangular pulses at the output means thereof, the output means including first and second output circuit means providing respectively rectangular pulses of substantially constant on-time and substantially constant off-time, and first and second switching circuit means of different construction for respective connection with one of the first and second output circuit means, the first switching circuit means being operable to switch upon dropping below a predetermined velocity or during standstill of the vehicle and the second switching circuit means being operable to switch upon exceeding a predetermined preset vehicle velocity.

2. An installation according to claim 1, characterized in that said sensor means for producing the frequency signal proportional to the vehicle velocity includes a sensor comprising an electrical coil disposed in the alternating field of a tachometer magnet and secured at a tachometer housing.

3. An installation according to claim 2, characterized in that a plurality of first switching circuit means are adapted to be connected to the first output circuit means and a plurality of second switching circuit means are adapted to be connected to the second output circuit means.

4. An installation according to claim 3, characterized in that each of the first switching circuit means has a different switching threshold and each of the second switching circuit means has a different switching threshold.

5. An installation according to claim 1, characterized in that said basic circuit means includes an input section consisting of an operational amplifier means connected as a comparator means for converting the signals coming from the sensor means into rectangular pulses.

6. An installation according to claim 5, characterized in that said basic circuit means includes a differentiating element means is connected in the output of the comparator means for converting the rectangular pulses coming from the comparator means into negative needle pulses.

7. An installation according to claim 6, characterized in that a monostable multivibrator means follows the differentiating element means and is responsive to the negative needle pulses for making available rectangular pulses at its output.

8. An installation according to claim 7, characterized in that the first and second output circuit means are low ohmic outputs for the control of the first and second switching circuit means, the output of the monostable multivibrator means being directly connected to the first output circuit means and being connected to the second output circuit means by way of an inverter stage.

9. An installation according to claim 8, characterized in that as many first switching circuit means as desired are adapted to be connected with the first output circuit means of the basic circuit means.

10. An installation according to claim 9, characterized in that as many second switching circuit means as desirable are adapted to be connected to the second output circuit means of the basic circuit means.

11. An installation according to claim 10, characterized in that an integrating element means is arranged in the input section of the first switching circuit means for integrating the rectangular pulses coming from the first output circuit means of the basic circuit means.

12. An installation according to claim 11, characterized in that a transistor connected as comparator means is connected to the integrating element means for blocking when dropping below a voltage proportional to a predetermined, preset velocity.

13. An installation according to claim 12, characterized in that a current amplifier means follows the last-mentioned comparator means and including an output circuit containing a switching relay.

14. An installation according to claim 13, characterized in that frequency voltage converter means is arranged in the input section of the second switching circuit means for converting the rectangular pulses appearing in the second output circuit means of the basic circuit means into a d.c. voltage.

15. An installation according to claim 14, characterized in that an operational amplifier means connected as a comparator means follows the frequency voltage converter means for switching upon exceeding a d.c. voltage proportional to a predetermined preset vehicle velocity.

16. An installation according to claim 15, characterized in that a current amplifier means follows the comparator means and including an output circuit containing a switching relay.

17. An installation according to claim 16, characterized in that said sensor means for producing the frequency signal proportional to the vehicle velocity includes a sensor comprising an electrical coil disposed in the alternating field of a tachometer magnet and secured at a tachometer housing.

18. An installation according to claim 1, characterized in that as many first switching circuit means as desired are connected with the first output circuit means of the basic circuit means.

19. An installation according to claim 18, characterized in that as many second switching circuit means as desirable are adapted to be connected to the second output circuit means of the basic circuit means.

20. An installation according to claim 19, characterized in that a frequency voltage converter means is arranged in the input section of the second switching circuit means for converting the rectangular pulses appearing in the second output circuit means of the basic circuit means into a d.c. voltage.

21. An installation according to claim 20, characterized in that an operational amplifier means connected as comparator means follows the frequency voltage converter means for switching upon exceeding a d.c. voltage proportional to a predetermined preset vehicle velocity.

22. An installation according to claim 21, characterized in that a current amplifier means follows the comparator means and including an output circuit containing a switching relay.

23. An installation according to claim 18, characterized in that an integrating element means is arranged in the input section of the first switching circuit means for integrating the rectangular pulses coming from the first output circuit means of the basic circuit means.

24. An installation according to claim 23, characterized in that a transistor connected as comparator means is connected to the integrating element means for blocking when dropping below a voltage proportional to a predetermined preset velocity.

25. An installation according to claim 24, characterized in that a current amplifier means follows the last-mentioned comparator means and including an output circuit containing a switching relay.

* * * * *

UNITED STATES PATENT OFFICE
CERTIFICATE OF CORRECTION

Patent No. 3,828,198          Dated August 6, 1974

Inventor(s) Hans-Jorg Florus, Horst Grossner and Gerhard Osswald

It is certified that error appears in the above-identified patent and that said Letters Patent are hereby corrected as shown below:

Title page as it reads now:

[73] Assignee: Daimlee-Benz Aktiengesellschaft,
                      Stuttgart, Germany Title page as it should read:

[73] Assignee: Daimler-Benz Aktiengesellschaft,
                      Stuttgart, Germany Signed and sealed this 3rd day of December 1974.

(SEAL)
Attest:

McCOY M. GIBSON JR.            C. MARSHALL DANN
Attesting Officer               Commissioner of Patents